US005289178A

United States Patent [19]

Schwendeman

[11] Patent Number: 5,289,178
[45] Date of Patent: Feb. 22, 1994

[54] SENSITIVITY INDICATOR FOR A RADIO RECEIVER AND METHOD THEREFOR

[75] Inventor: Robert J. Schwendeman, Pompano Beach, Fla.

[73] Assignee: Motorola, Inc., Schaumburg, Ill.

[21] Appl. No.: 930,497

[22] Filed: Aug. 17, 1992

Related U.S. Application Data

[63] Continuation of Ser. No. 684,476, Apr. 11, 1991, abandoned, which is a continuation of Ser. No. 419,552, Oct. 10, 1989, abandoned.

[51] Int. Cl.⁵ .............................................. H04Q 1/00

[52] U.S. Cl. ................................ 340/825.44; 371/5.1; 371/20.4; 455/67.4; 455/67.3; 455/226.1

[58] Field of Search ........... 340/825.44, 825.2, 825.21, 340/311.1, 715, 800; 371/5.1, 5.5, 20.4, 25.1, 57.2; 455/67.4, 67.3, 226.1, 134, 135

[56] References Cited

U.S. PATENT DOCUMENTS

| | | | |
|---|---|---|---|
| 3,562,710 | 2/1971 | Halleck | 371/5.1 |
| 3,596,245 | 7/1971 | Finnie | 371/5.4 |
| 3,973,242 | 8/1976 | Field et al. | |
| 4,086,537 | 4/1978 | Asakawa et al. | |
| 4,093,940 | 6/1978 | Maniere | 371/5.1 |
| 4,113,361 | 9/1978 | Nakano | 340/800 |
| 4,383,257 | 5/1983 | Giallanza et al. | 340/825.44 |
| 4,554,540 | 11/1985 | Mori et al. | 340/825.44 |
| 4,630,266 | 12/1986 | Deparis et al. | 371/5.1 |
| 4,649,538 | 3/1987 | DeLuca et al. | 371/5.1 |
| 4,720,710 | 1/1988 | Akahori et al. | 340/825.44 |
| 4,851,820 | 7/1988 | Fernandez | 340/825.44 |

FOREIGN PATENT DOCUMENTS

| | | | |
|---|---|---|---|
| 3240490 | 5/1984 | Fed. Rep. of Germany | 371/20.4 |
| WO89/04527 | 5/1989 | PCT Int'l Appl. | |
| 0788400 | 12/1980 | U.S.S.R. | 371/20.4 |
| 0809591 | 3/1981 | U.S.S.R. | 371/20.4 |
| 0669921 | 1/1982 | U.S.S.R. | 371/20.4 |
| 2089517 | 6/1982 | United Kingdom | 371/20.4 |

OTHER PUBLICATIONS

Motorola Binary Digital Radio Pager, Manual No. 68P81012C70, Issue O, p. 10, published Ft. Lauderdale, Fla. Feb. 21, 1977.

Motorola PMR 2000 Personal Message Receiver, POCSAG Model, product catalog sheet R3-5-128, published Schaumburg, Ill., 1986.

*Primary Examiner*—Donald J. Yusko
*Assistant Examiner*—Brian Zimmerman
*Attorney, Agent, or Firm*—Philip P. Macnak; Thomas G. Berry; Daniel R. Collopy

[57] ABSTRACT

This invention provides an indication of quality of signal reception in a selection call system such as a paging system, by comparing received data with preprogrammed data and indicating the degree of discrepancy therebetween.

19 Claims, 6 Drawing Sheets

SENSITIVITY INDICATOR FOR A RADIO RECEIVER AND METHOD THEREFOR

This application is a continuation of U.S. patent application No. 07/684,476 filed Apr. 11, 1991, now abandoned, which is a continuation of U.S. patent application No. 07/419,552 filed Oct. 10, 1989, now abandoned.

FIELD OF THE INVENTION

This invention relates to an indicator for a radio receiver, such as a pager or other selective call receiver, for indicating quality of reception and/or out of range probability.

DESCRIPTION OF THE PRIOR ART

Some pagers have an out-of-range indicator, which provides to the pager user an indication of the out-of-range condition when a specific signature signal available within the signaling protocol (such as POCSAG) does not appear for a specified length of time. This indication disappears upon a single occurrence of the signature signal until the time again elapses. An out-of-range indicator of the type described will show a pager to be within range, even when the true probability of message reception may be very low, e.g. only 10 or 20%.

It is known generally in the art of selective call receivers that other methods for measuring out-of-range conditions also exist, such as using analog methods to provide an indication of received signal strength. However, received signal strength alone does not always give an accurate indication of probability of message reception. This is particularly true at the lower end of received signal strength levels.

SUMMARY OF THE INVENTION

According to a first aspect of the present invention a selective call receiver comprises a means for receiving selective call signals transmitted in a predetermined signaling format, the signaling format including at least a synchronization code word and address information transmitted as a sequence of data, the synchronization code word being periodically transmitted during the data sequence; a means for storing a predetermined synchronization codeword; a means for comparing the data sequences received with the predetermined synchronization codeword stored, and for generating a correlation detection signal indicating the detection and absence of detection of correlation between the received and stored synchronization codewords; a register means, having a predetermined number of stages, responsive to the correlation detection signal for accumulating a first correlation count indicating a detection of a first received synchronization codeword, the register means further sequentially accumulating subsequent correlation counts indicating the detection and absence of detection of subsequently received synchronization codewords; a controller means coupled to the register means, for detecting when the first detected correlation count accumulated has shifted to the last stage of the register means, and for generating a display enable signal in response thereto; and a display means, responsive to the display enable signal, for displaying an indication of the accumulated correlation count which corresponds to the number of correlations between the received and stored synchronization codewords within a first time interval, the indication displayed thereafter being periodically updated with subsequently received synchronization codewords to provide a substantially continuous display of the quality of selective call signal reception.

In accordance with a second aspect of the present invention a method for providing a substantially continuous display of signal quality in a radio receiver operating in a communication system utilizing a predetermined signaling format which includes data and a periodically transmitted data sequence characteristic of the signaling format comprises the steps of:

A. receiving the transmitted data and the periodically transmitted data sequence;

B. comparing the periodically transmitted data sequence received with a predetermined data sequence characteristic of the signaling format;

C. generating correlation detection signals indicating the detection and absence of detection of correlation between the periodically transmitted data sequence received and the predetermined data sequence;

D. generating a first correlation count indicating the detection of a first received data sequence and storing the same in response to the first correlation detection signal being generated which indicates the detection of correlation between the periodically transmitted data sequence received and the predetermined data sequence;

E. starting a timer to provide a measurement of elapsed time when the first correlation count indicating the detection of a first received data sequence is generated;

F. generating subsequent correlation counts indicating the detection and absence of detection of subsequently received data sequences and sequentially storing the same in response to subsequent correlation detection signals being generated which indicate the detection and absence of detection of correlation between the periodically transmitted data sequence received and the predetermined data sequence;

G. resetting the timer each time a subsequent correlation count indicating the detection of a received data sequence is generated;

H. detecting when a predetermined number of correlation counts have been stored following the storage of the first correlation count; and I. displaying an indication of the number of correlation counts stored which indicate detection of the received data sequences in response to a predetermined number of correlation detection signals being generated.

In accordance with a third aspect of the present invention a selective call receiver comprises a means for receiving selective call signals transmitted in a predetermined signaling format, the signaling format including at least address information transmitted as a sequence of data, and a periodically transmitted data sequence characteristic of the signaling format; a means, responsive to the received data sequence, for synchronizing the reception of the selective call signals in the predetermined signaling format; a timing means responsive to said synchronizing means for providing timing signals synchronized to the reception of the periodically transmitted data sequence; a means for storing a predetermined data sequence characteristic of the signaling format; a means for comparing the data sequences received with the predetermined data sequence stored, and for generating a correlation detection signal indicating the detection and absence of detection of correlation between the received and stored data sequences; a register means, having a predetermined number of storage locations, responsive to the correlation detection signal for accumulating a first correlation count indicating a detection of a first received data sequence characteristic of the signaling format, the register means further sequentially accumulating subsequent correlation counts indicating the detection and absence of detection of subsequently received data sequences; a first counting means, for providing a measure of elapsed time by generating a count in response to the timing signals; a controller means, coupled to the register means, for detecting when the first detected correlation count accumulated has shifted to the last storage location of the register means, and for generating a display enable signal in response thereto, the controller means further resetting the count of said first counting means in response to the correlation detection signal being generated; and a display means, responsive to the display enable signal, for displaying an indication of the accumulated correlation count which corresponds to the number of correlations between the received and stored data sequences within a first time interval, the indication displayed thereafter being periodically updated with subsequently received data sequences characteristic of the signaling format to provide a substantially continuous display of the quality of selective call signal reception.

DETAILED DESCRIPTION OF THE PREFERRED EMBODIMENTS

Figure 1:
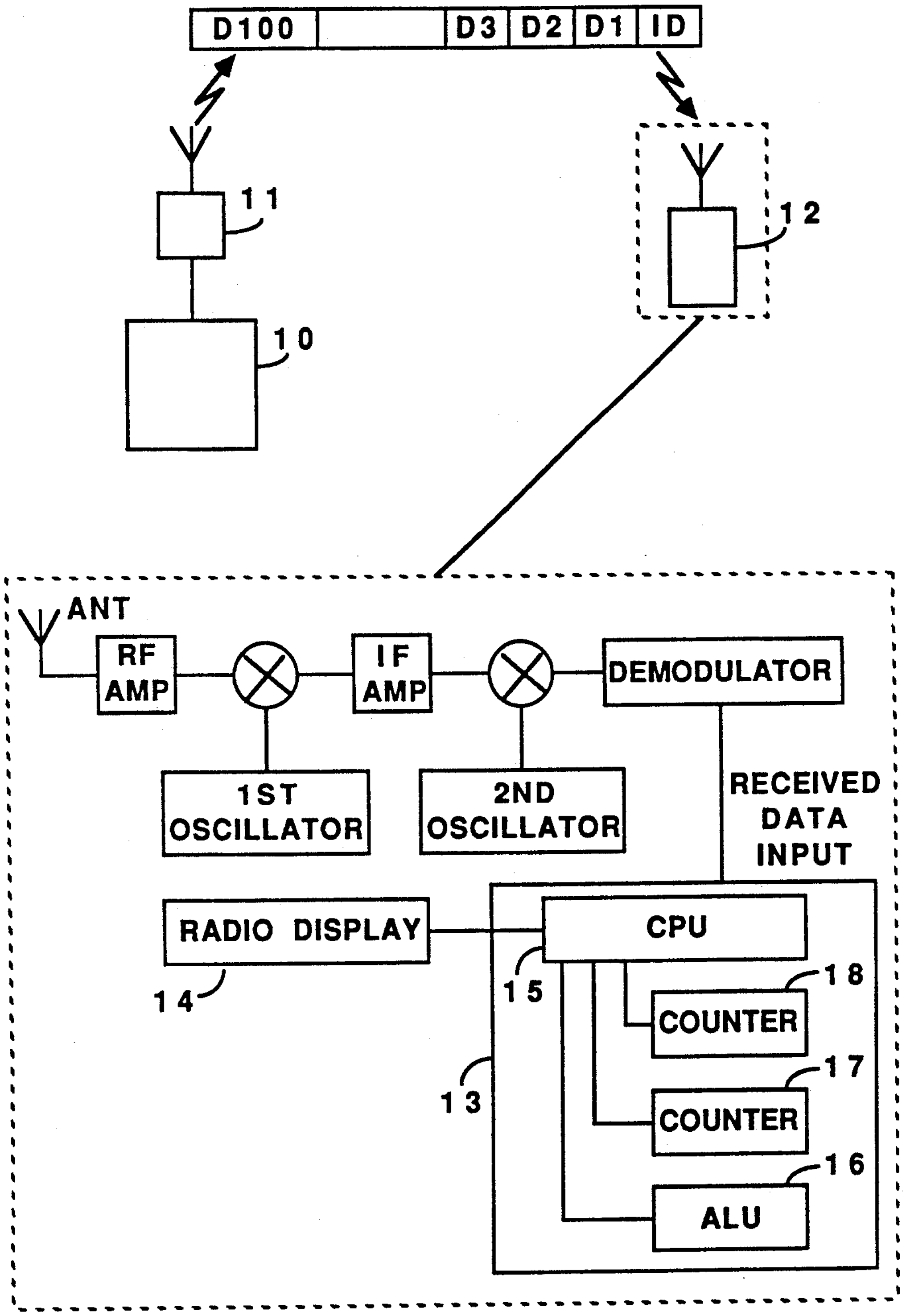
FIG. 1 is a diagram of a paging system in accordance with a first embodiment of the invention.

Referring to FIG. 1, there is shown a paging system comprising a paging terminal 10, a paging transmitter 11 and a pager 12. Each of these elements is structurally identical to known elements in the art. In particular the pager 12 is a numeric or alphanumeric display pager, with certain additional programs and features as are now explained. The pager comprises receiver circuitry as shown in the inset of FIG. 1, as well as a microprocessor 13 and a display 14. The microprocessor 13 comprises a central processing unit 15, an arithmetic and logic unit 16 and at least two counters 17 and 18.

In one embodiment of the present invention, the pager 12 is capable of being placed in a test mode. The manner of entering a test mode is by way of a unique button sequence, such as by depressing the read switch and the reset switch simultaneously while the pager 12 is being turned on. The test mode may alternately be entered by means of a menu displayed on the pager display. The pager of the present invention has an additional test mode, over and above existing test modes, such as described in U.S. Pat. Nos. 4,599,615 and 4,649,538, and U.K. Patent Application No. 2 124 001 A. This additional test mode may be referred to as a page sensitivity utility.

The paging terminal 10 causes a specific series of data words to be transmitted by the transmitter 11 at predetermined intervals at a desired baud rate, such as 300, 600, or 1200 bits per second which may be representative of the actual paging data bit rate currently in service, or to be placed into service. The predetermined data words are illustrated in FIG. 1 and comprise a unique ID followed by 100 data words. The ID corresponds to a unique address to which the pager 12 is responsive when the pager has been placed in the test mode. This ID and the data words D1–D100 are preprogrammed in the pager 12. When the pager 12 is in the page sensitivity utility mode it receives and identifies this ID in a manner well known in the art, and compares the 100 received data words with the corresponding data words stored in memory. When the transmission is complete and the pager 12 has carried out the comparison, the pager 12 displays the number of data words correctly received. This number provides a "figure of merit" having no units, but which can be interpreted as representing the effective paging probability, or probability of receiving a page, expressed as a percentage. It can be used for comparison against other readings from different locations using the pager 12, or with different pagers, assuming such a comparison can be readily made with the other pagers. When a comparison of readings is to be made, the service engineer or operator simply moves to a new location, and when at that location, the pager receives a retransmission of the predetermined sequence of words, and a new reception quality indication is displayed. The tests can also be repeated at different transmitter powers, different antennas etc, and provide the service operator an indication of the actual area of coverage provided being provided by the system under the different measurement conditions.

Figure 2:
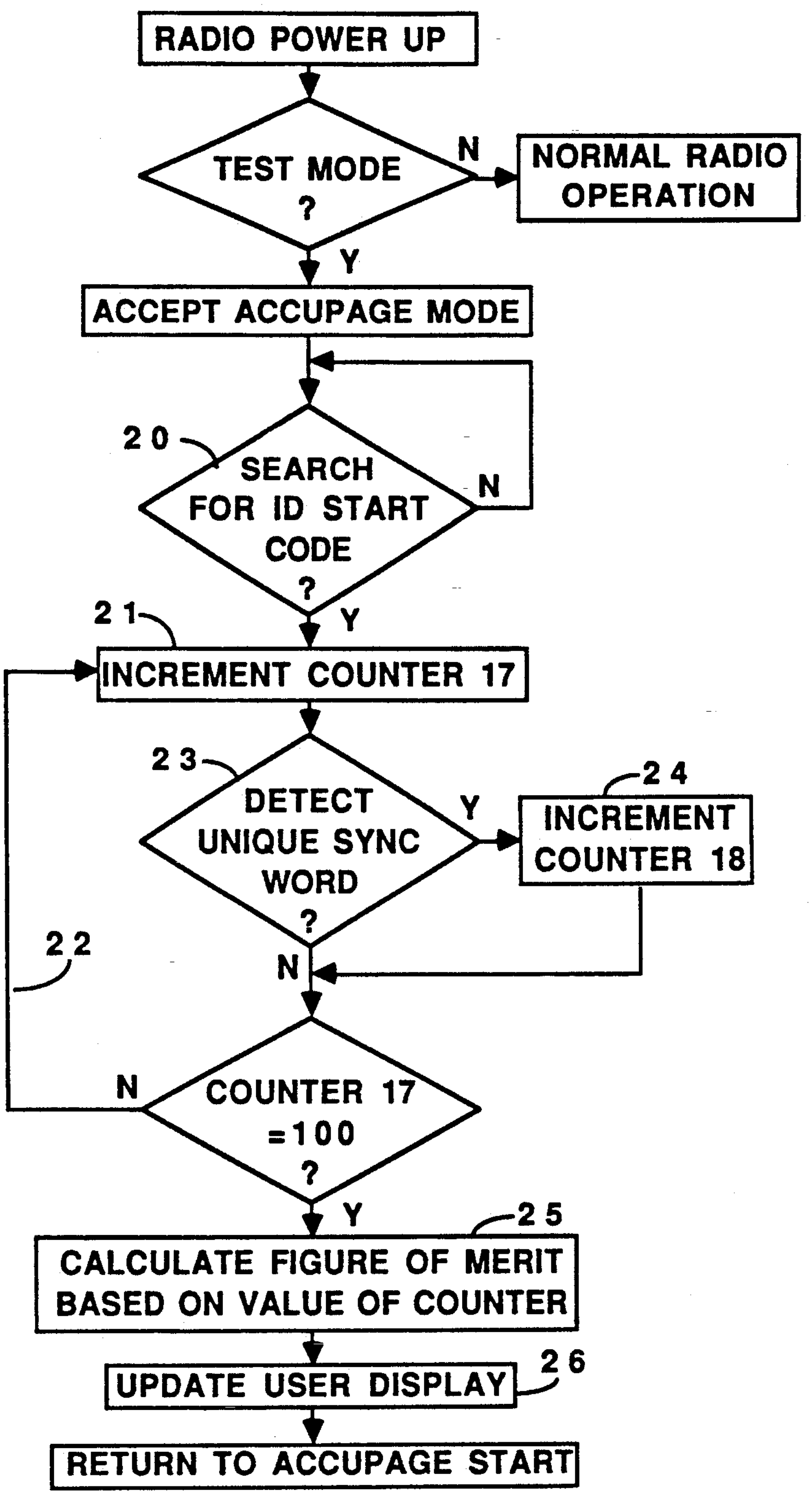
FIG. 2 is a flow diagram showing the operation of a pager in the system of FIG. 1.

FIG. 2 shows a flow diagram illustrating the operation of the above described embodiment. The operation of the flow diagram calls for two counters 17 and 18, as shown in FIG. 1, embodied in the pager 12. After the test mode has been entered by the user, the pager begins searching for the ID start code. When the ID start code is detected in step 20, counter 17 is incremented in step 21. Thereafter, counter 17 is incremented each time the program executes loop 22. This loop is executed once for each period of time a data word is expected to be thereafter received, such as every eight bits for an eight bit data word. If one of the data words D1–D100 is correctly detected in step 23, counter 18 is incremented in step 24. Once counter 17 reaches a count of 100, the figure of merit is calculated in step 25 and this figure is displayed on the radio display 14 of FIG. 1 in step 26.

It will be appreciated that modifications of detail can be made. For example, in the above method, there is a high degree or redundancy in the predetermined sequence of words transmitted. For example, if each word is eight bits in length, any number of errors within a word from 1–8 will degrade the quality indication by only one point. Thus, other methods of comparison could be used whereby the received data and the data stored in the pager 12 are compared on a bit-by-bit basis and an indication is given of the percentage of correct bits overall.

Figure 3:
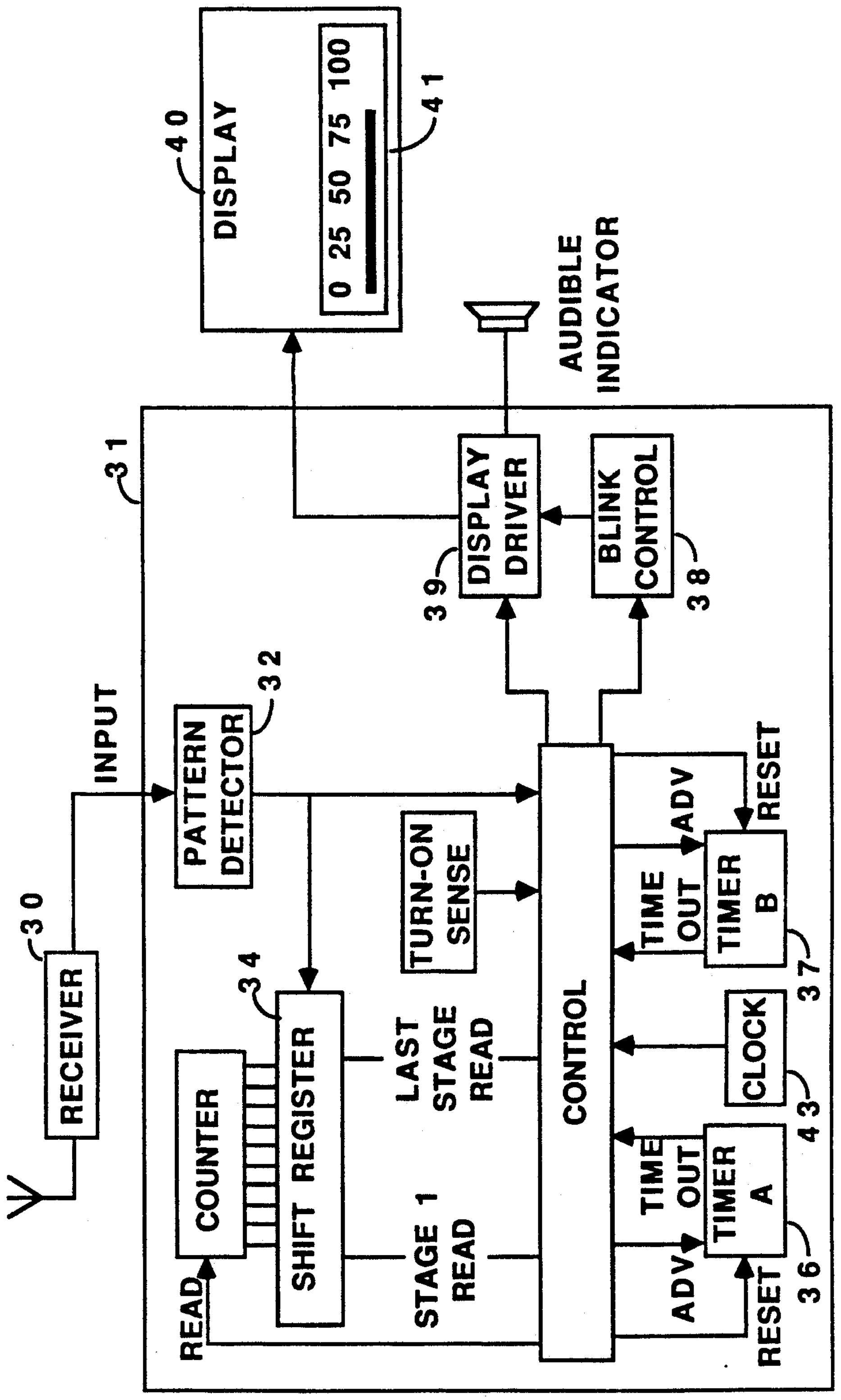
FIG. 3 is a diagram of a pager in accordance with a second embodiment of the invention.

Referring now to FIG. 3, a pager in accordance with a second embodiment of the present invention is shown, comprising receiver circuitry 30 as for FIG. 1. The recovered data bit stream from the receiver circuitry 30 is coupled to a microprocessor 31. The microprocessor 31 performs a number of functions, the relevant ones of which are represented by boxes on the diagram. These elements do not necessarily form identifiable elements of hardware. The recovered data bit stream from the receiver circuitry 30 is first fed to a pattern detector means 32, which detects the synchronization codeword, such as when the POCSAG signaling format is being transmitted, or any other representative bit pattern within the received protocol. Each time the synchronization codeword is successfully detected by the pattern detector 32, the output of pattern detector 32 is set to a logic 1 state, remaining in that state until reset to a logic 0 state by a clock pulse generated by clock 43. A logic 1 pulse is also provided to the input of shift register 34 at the time the clock pulse is generated. Should the synchronization codeword fail to be subsequently detected, the output of pattern detector 32 would then remain in the logic 0 state, and a logic 0 pulse will also be provided to the input of shift register 34. This operation allows a synchronous detection of the synchronization codewords. The detections are then loaded into a software shift register 34 each time the clock pulse is generated. Means are provided for reading the first stage of this shift register 34 and the last stage (or some other stage), as will be explained shortly. Two timers 36 and 37, hereafter referred to as timer A and timer B respectively are provided in the microprocessor 31 together with a display interrupt unit 38 and an display driver 39. The display driver drives a display 40, which includes a visual indicator, which in the preferred embodiment of the present invention is in the form of a bar indicator 41. The display interrupt unit 38 causes the display to momentarily blink each time the expected pattern, such as the synchronization codeword, is successfully detected, thereby providing positive feedback that measurements are being made. Failure of the display to periodically blink for an extended length of time, such as a thirty second time interval, would indicate such circumstances, as the absence of channel activity or an out-of-range condition.

The operation of the pager of FIG. 3 will be described with reference to the flow chart of FIG. 4. This flow chart shows two programs which run consecutively. On the left hand side, there is shown a program which receives the pulses generated at the output of pattern detector 34 for each successful detection of the synchronization codeword (step 100). These pulses are loaded into the shift register 34 as previously described. For each successfully detected synchronization codeword, a logic 1 pulse is loaded into the shift register 34 and timer A 36 is reset in step 102. For each non-successful detection of the synchronization codeword, a logic 0 pulse is passed to the shift register 34, which results in the timer A count being advanced one clock time interval by clock 43. In summary, timer A is reset each time a synchronization codeword is detected, and advanced each time a synchronization codeword is not detected in the allotted time interval.

On the right hand side, there is shown a timing program for reading the shift register 34 and for calculating the percentage detection rate based on the output of shift register 34. By way of preliminary explanation of this diagram, the shift register 34 has a length Y, the period of timer B is less than the period of timer A and is greater than the time length of the period between the pattern codewords to be measured. In the preferred embodiment of the present invention, timer B is sufficiently long to enable detection of at least ten pattern codewords.

For each pulse received from the clock 43, timers A and B are advanced in step 110, and a pulse is loaded into the shift register as previously described at step 112. If timer A has expired, the program passes from step 114 to step 116 at which the shift register 34 stages are cleared and a zero indication is displayed on the display 41. From this, and from step 102, it can be seen that timer A only expires if a series of zeros are received into the shift register, indicating no match with the synchronization codeword for a predetermined period of time. If timer A has not expired at step 114, the program passes to decision 117 and, because in the first instance timer B has expired as a result of a previous cycle, the program passes to step 118 and the last stage of the shift register is read. If, upon reading the last stage of the register, the bit stored is a zero, this is determined in decision 120 and no action is taken, the program returning to steps 100 and 108. When a logic 1, indicating the first detected pulse has propagated through shift register 34, appears in the last stage of the register, all the stages of the shift register which contain 1's are summed, to give a value X. This operation is carried out in step 124. After step 124, timer B is reset at step 125 so that on the next execution of decision 117, step 130 will be reached. Until such time as the first detect appears in the last stage of the register, the program waits for the next pulse.

The first detection percentage for the desired pattern is calculated in step 126 as 100X/Y for codewords in which the probability of detection of the desired pattern equals the probability of detection of an address (this is approximately true for POCSAG). The result is then displayed on display 41 by a graph number or other suitable means. For a more complex code, X or 100X/Y may be used to provide an address for a ROM (read-only memory) which stores a tabulation of the address detection percentage corresponding for the detection percentage derived by the measurement of the desired patterns. The display changes upon each execution of step 126, i.e. after each count.

Once the first detection percentage calculation has been made, further calculations are triggered by successful synchronization codeword detections read from the first stage of shift register at step 130. Simultaneously step 126 causes display interrupt unit 38 to blink the display 41 for a short blank period, such as a 1/10 second time interval.

In summary, as pulses are generated indicating the successful reception of the synchronization codeword, or other pattern, logic 1's are clocked into shift register 34. In the event the synchronization codeword was not successfully received, a logic 0 is clocked into the shift register 34. When the first logic 1 has propagated through to the last stage of shift register 34, timer B is started, and a computation of the detection percentage is made and displayed. Thereafter, the detection percentage is updated and displayed for each new detection determined by a logic 1 being shifted into the first stage of shift register 34, and counter B is reset. The detection percentage continues to be updated as long as timer B is reset prior to its timing out. When timer B times out, the last detection percentage remains displayed without any further update until timer A times out, indicating the absence of transmissions of the synchronization codeword on the channel for an extended period of time. The cycle would repeat the next time a logic 1 has propagated through to the last stage of shift register 34.

Figure 4:
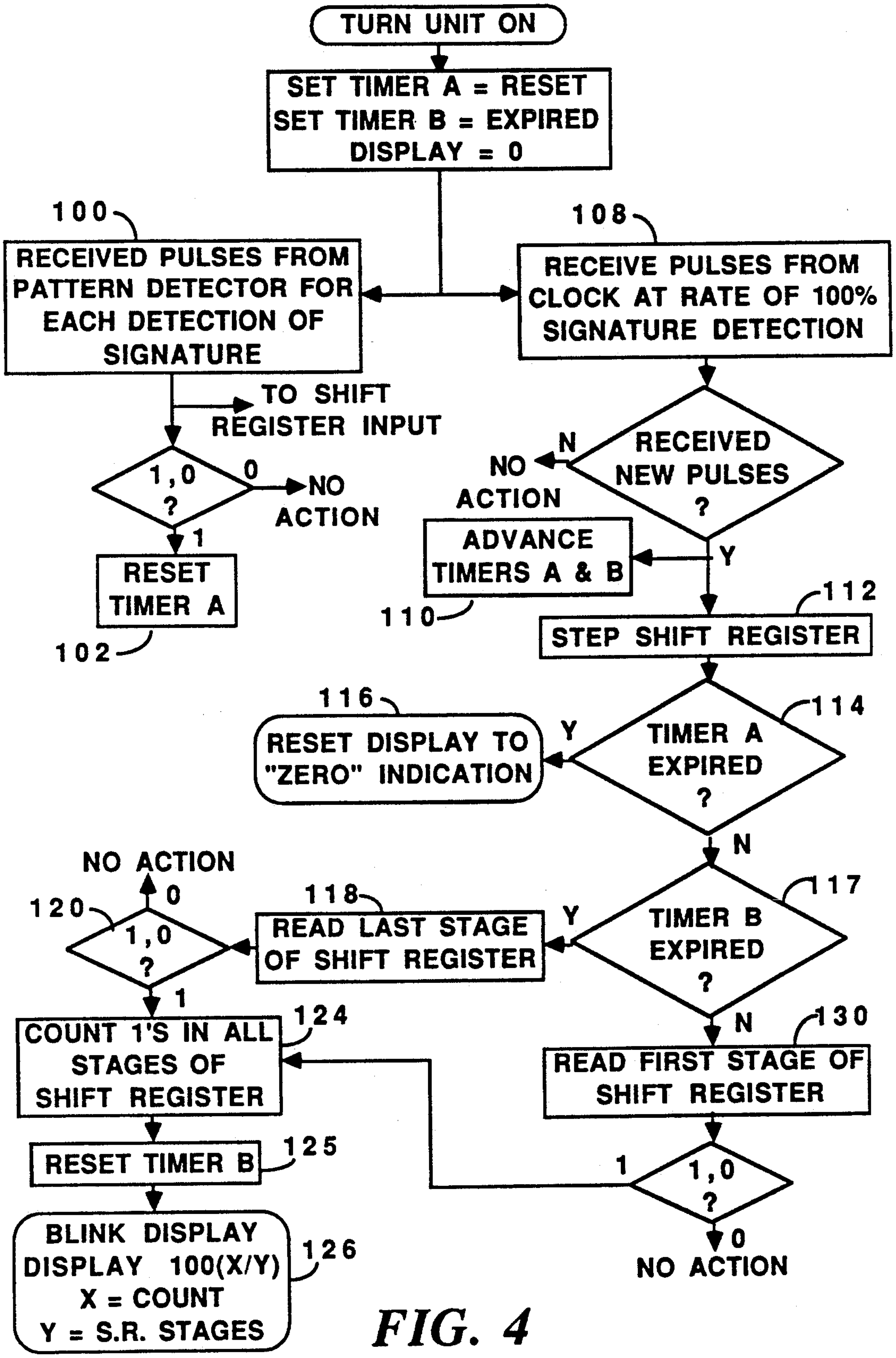
FIG. 4 is a flow diagram showing the operation of the pager of FIG. 3.
Figure 5:
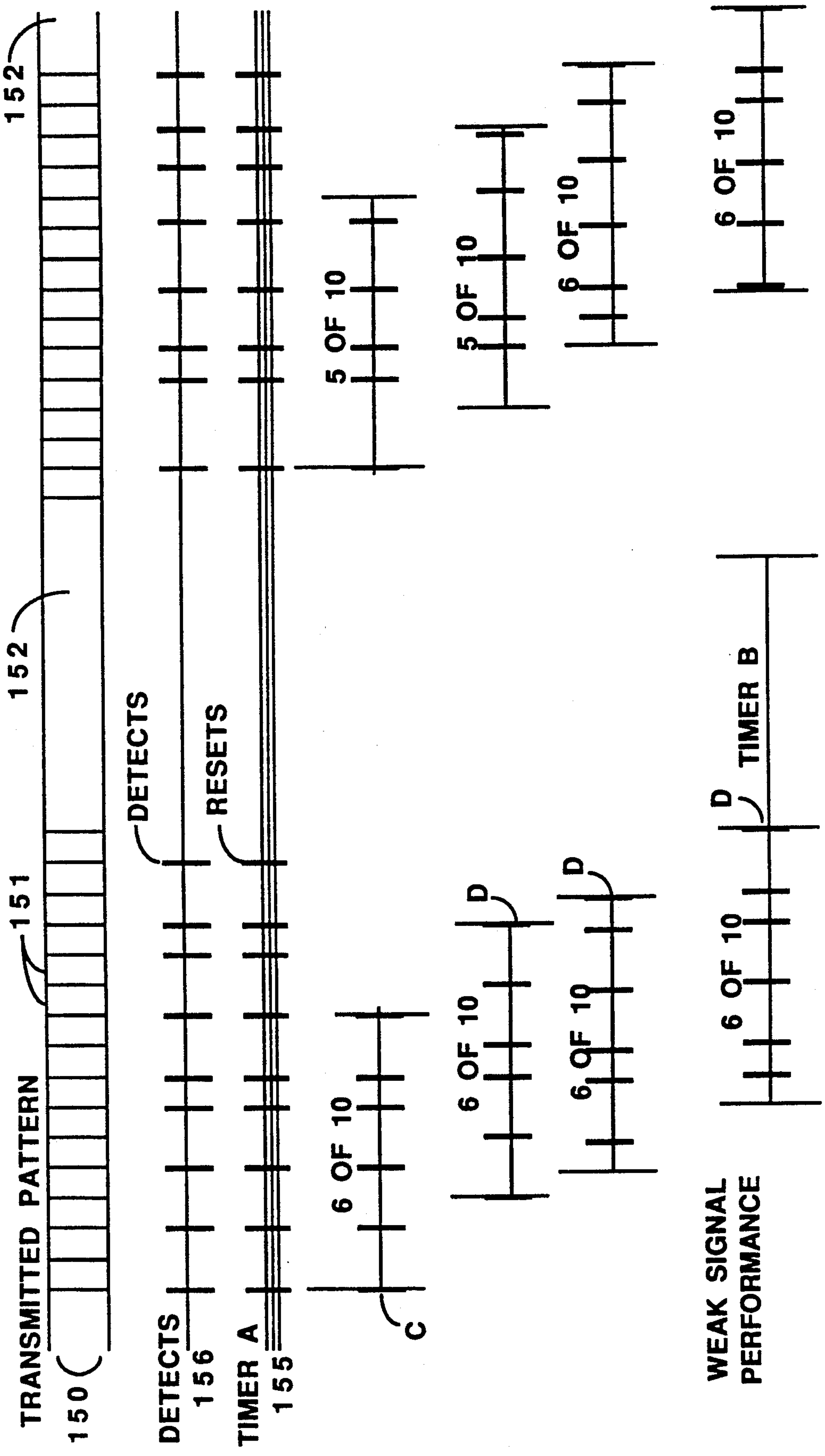
FIG. 5 is a timing diagram illustrating the operation of the pager of FIG. 3 in accordance with the flow diagram of FIG. 4.

The operation of the pager of the second embodiment of the present invention, as described with reference to FIGS. 3 and 4 is further described with reference to FIG. 5. FIG. 5 illustrates the operation of the present invention using a shift register having a length of ten bits.

FIG. 5 shows a typical data pattern 150 transmitted by a transmitter such as transmitter 11 of FIG. 1. The data pattern comprises a sequence of message batches 151 such as would be transmitted using the POCSAG signaling format. Within each of the message batches the unique pattern codeword, in this instance, the POCSAG synchronization codeword is transmitted at the beginning of each batch. The synchronization codeword is repeated periodically as additional message batches are transmitted on the channel. The data pattern 150 also illustrates the fact that there may be time interval 152 during which no transmissions are being made, or during which time other signaling formats may be transmitted on the channel. The output from the pattern detector 32 is shown as signal 154, each pulse indicating a successful detection of the synchronization codeword. As shown, there are also instances where the synchronization codeword was not successfully detected. Each time a successful detect is indicated, timer A is reset, as shown at 155. The contents of shift register 34 is represented in FIG. 5 by pattern 156 which shows the changes in the contents of the register over a period of time. Point C on the figure represents the contents of the last stage of the shift register which in this case is a logic 1. As previously explained, this triggers the first detection percentage calculation. Thereafter, as shown at point D, the first stage of the shift register is read for the purposes of determining when to make the next detection percentage calculation. An updated detection percentage calculation is made each time a successful synchronization codeword detection is made. From the contents of shift register 34, FIG. 5 illustrates by example six successful detections occurred, or X=6, giving rise to a page detection percentage of 60%. When the transmissions of message batches 151 have ceased, no further successful synchronization codeword detections are obtained allowing timer B to time out. The process is repeated when the next synchronization codeword is received, and since timer B timed out, the first calculation of detection percentages again keys on the last stage of the shift register. The last stage of the shift register is use to key the calculation of the detection probabilities after the expiration of timer B because it provides the advantage of preventing false counts which often occur at the beginning of the transmission.

Timer A has a period substantially greater than timer B and acts as a fail safe. If no additional synchronization codewords are received during the period before timer A expires, the display will continue to read the last calculated detection percentage count. When timer A expires, it indicates no additional successful synchronization detections have been made for a substantial period of time and consequently the display is set to zero. In contrast, timer B maintains the last percentage detection reading on the display for long enough for the next synchronization codeword to be received.

Figure 6:
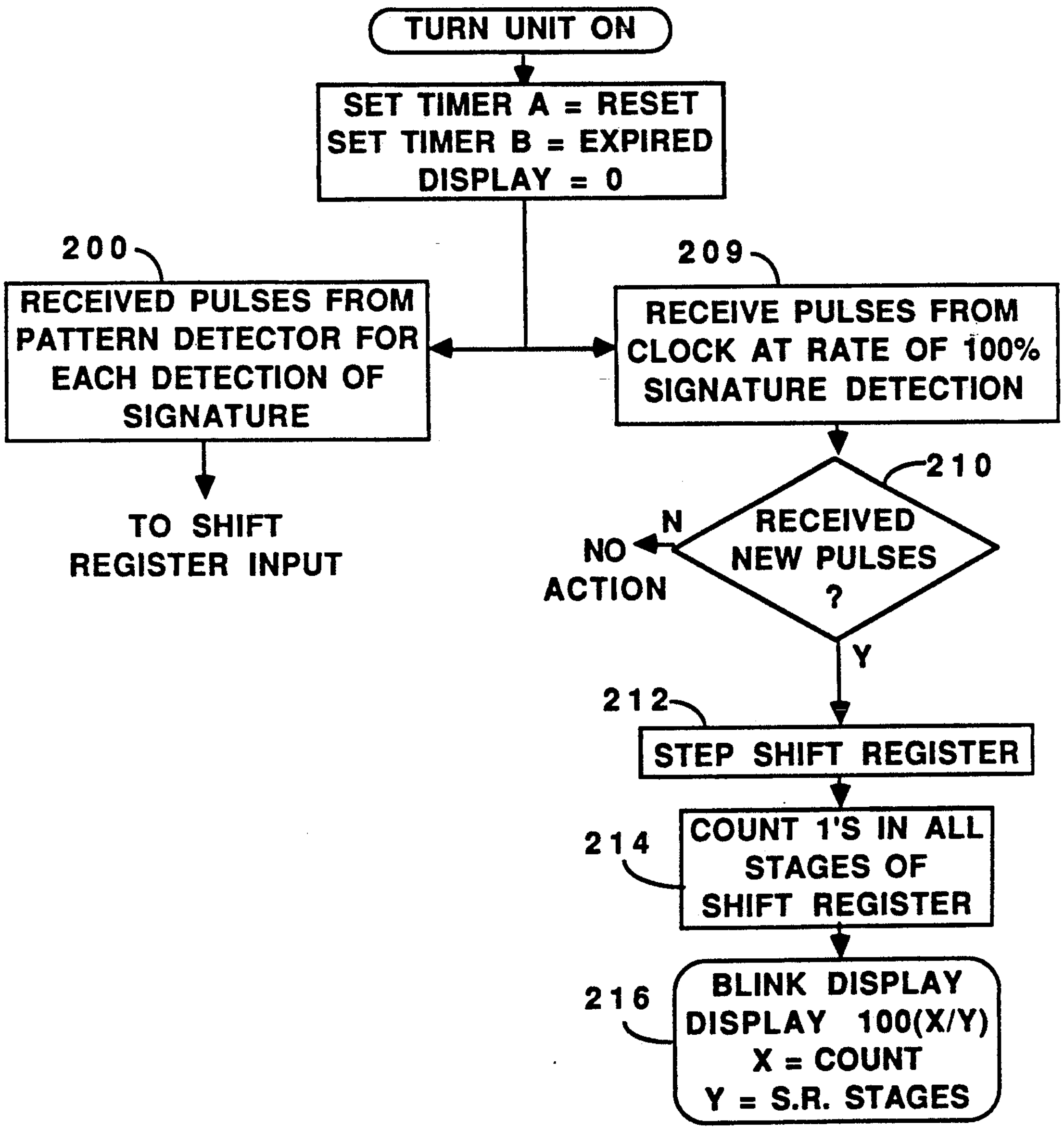
FIG. 6 is a flow diagram showing the operation of the pager of FIG. 3 in accordance with a third embodiment of the invention.

An alternate embodiment of the present invention will now be described with reference to FIG. 6. In this embodiment, the data is transmitted in a single signaling format, such as POCSAG. There are no periods of data in other signaling formats, and there are no periods wherein data is absent, such as periods 152 in FIG. 5. Such a condition would exist on a fully loaded system which does not share the channel with other signaling formats. In this embodiment, timer A is not required, making the flow diagram somewhat more simplified. Step 200 corresponds to step 100 of FIG. 4, with the received pulses passing directly from the pattern detector to the shift register 34. Step 208 corresponds to step 108. If a new pulse is received, the shift register is loaded in step 212 and all the ones in the shift register are counted in step 214, whereupon in step 216 the display is blinked and a new value of 100 X/Y is calculated and displayed. In step 212, the shift register is stepped regardless of whether a detect is received or not. While the shift register length has been described as ten bits in length, it will be appreciated that the length of the shift register can be changed, to provide greater or lesser resolution to the calculation of the detection percentages. A longer shift register is particularly applicable to the embodiment described in FIG. 6, since the shift register is not regularly reset.

It will also be appreciated that modifications of detail can be made. For example, in the above method, there is a high degree or redundancy in the predetermined sequence of words transmitted. For example, since the length of the synchronization codeword is thirty-two bits in length, any number of errors within the codeword from 1-32 will degrade the quality indication by only one point. Thus, other methods of comparison could be used whereby the received synchronization codeword and the synchronization codeword stored in the pager 12 are compared on a bit-by-bit basis and an indication is given of the percentage of correct bits overall.

While specific embodiments of this invention have been shown and described, further modifications and improvements will occur to those skilled in the art. All modifications which retain the basic underlying principles disclosed and claimed herein are within the scope and spirit of the present invention.

What is claimed is:

1. A selective call receiver comprising:

means for receiving selective call signals transmitted in a predetermined signaling format, the signaling format including at least a synchronization code word and address information transmitted as a sequence of data, the synchronization code word being periodically transmitted during the data sequence;

means for storing a predetermined synchronization codeword;

means for comparing the data sequences received with the predetermined synchronization codeword stored, and for generating a correlation detection signal indicating the detection and absence of detection of correlation between the received and stored synchronization codewords;

a register means, having a predetermined number of stages, responsive to the correlation detection signal for accumulating a first correlation count indicating a detection of a first received synchronization codeword, said register means further sequentially accumulating subsequent correlation counts indicating the detection and absence of detection of subsequently received synchronization codewords;

controller means, coupled to said register means, for detecting when the first detected correlation count accumulated has shifted to the last stage of said register means, and for generating a display enable signal in response thereto; and display means, responsive to the display enable signal, for displaying an indication of the accumulated correlation count which corresponds to the number of correlations between the received and stored synchronization codewords within a first time interval, the indication displayed thereafter being periodically updated with subsequently received synchronization codewords to provide a substantially continuous display of the quality of selective call signal reception.

2. The selective call receiver of claim 1 further comprising:

means, responsive to the received synchronization codeword, for synchronizing the reception of the selective signals in the predetermined signaling format;

timing means responsive to said synchronizing means for providing timing signals synchronized to the reception of the periodically transmitted synchronization codeword; and first counting means, for providing a measure of elapsed time by generating a count in response to the timing signals, said controller means resetting the count of said first counting means in response to the correlation detection signal being generated, whereby said first counting means is periodically reset when the received synchronization codeword is detected.

3. The selective call receiver of claim 2 wherein said shift register is resettable, and said control means is responsive to the count of said first counting means, for resetting the shift register when the count in said first counting means exceeds a predetermined count corresponding to an elapsed time equal to a first predetermined time interval.

4. The selective call receiver of claim 2, wherein said controller means includes means for effecting the display of the number of detections representing signal quality for subsequent counts detected in the first stage of said shift register, after the first count has shifted into the last stage of said shift register.

5. The selective call receiver of claim 4, wherein said controller means further comprises means for latching the display of the number of detections after the end of said first predetermined time interval, whereby a continuous indication of the quality of reception is displayed from detection to detection.

6. The selective call receiver of claim 5 further comprising second counting means, coupled to said controller means and responsive to the timing signals for providing a count starting when the first count loaded into the first stage of said shift register is shifted to the last stage, said controller means thereafter resetting the count of said second counting means in response to subsequent counts indicating correlation between the received data sequence and the stored data sequence being loaded into the first stage of said shift register, whereby said second counting means is periodically reset when the subsequently received synchronization codeword is detected and shifted into the first stage of said shift register.

7. The selective call receiver of claim 6 wherein the count of said second counter means expires when the count exceeds a predetermined count corresponding to an elapsed time equal to a second predetermined time interval, and said controller means is further responsive to said second counter means being expired for monitoring the last stage of the shift register to detect when the first count has shifted into the last stage.

8. The selective call receiver of claim 7, wherein the second time interval is substantially greater than said first time interval, and wherein means are provided for displaying an indication of no reception if no synchronization codeword is detected during said second time interval.

9. A method for providing a substantially continuous display of signal quality in a radio receiver operating in a communication system utilizing a predetermined signaling format which includes data and a periodically transmitted data sequence characteristic of the signaling format, said method comprising the steps of:

A. receiving the transmitted data and the periodically transmitted data sequence;

B. comparing the periodically transmitted data sequence received with a predetermined data sequence characteristic of the signaling format;

C. generating correlation detection signals indicating the detection and absence of detection of correlation between the periodically transmitted data sequence received and the predetermined data sequence;

D. generating a first correlation count indicating the detection of a first received data sequence and storing the same in response to the first correlation detection signal being generated which indicates the detection of correlation between the periodically transmitted data sequence received and the predetermined data sequence;

E. starting a timer to provide a measurement of elapsed time when the first correlation count indicating the detection of a first received data sequence is generated;

F. generating subsequent correlation counts indicating the detection and absence of detection of subsequently received data sequences and sequentially storing the same in response to subsequent correlation detection signals being generated which indicate the detection and absence of detection of correlation between the periodically transmitted data sequence received and the predetermined data sequence;

G. resetting the timer each time a subsequent correlation count indicating the detection of a received data sequence is generated;

H. detecting when a predetermined number of correlation counts have been stored following the storage of the first correlation count; and I. displaying an indication of the number of correlation counts stored which indicate detection of the received data sequences in response to a predetermined number of correlation detection signals being generated.

10. The method of claim 9 further comprises the steps of:

J. performing steps A, B and C;

K. generating a subsequent correlation count indicating the detection and absence of detection of subsequently received data sequences;

L. eliminating the oldest correlation count stored;

M. storing the subsequently generated correlation count in response to subsequent correlation detection signals being generated; and N. displaying an updated indication of the number of correlation counts stored which indicate detection of the received data sequences also in response to the correlation detection signal being generated.

11. The method of claim 10 further comprising the step of

O. comparing the elapsed time measurement with a predetermined elapsed time in response to subsequent correlation detection signals being generated; and P. inhibiting said step of receiving in response to the elapsed time measurement exceeding the predetermined elapsed time.

12. A selective call receiver comprising:

means for receiving selective call signals transmitted in a predetermined signaling format, the signaling format including at least address information transmitted as a sequence of data, and a periodically transmitted data sequence characteristic of the signaling format;

means, responsive to the received data sequence, for synchronizing the reception of the selective call signals in the predetermined signaling format;

timing means responsive to said synchronizing means for providing timing signals synchronized to the reception of the periodically transmitted data sequence;

means for storing a predetermined data sequence characteristic of the signaling format;

means for comparing the data sequences received with the predetermined data sequence stored, and for generating a correlation detection signal indicating the detection and absence of detection of correlation between the received and stored data sequences;

register means, having a predetermined number of storage locations, responsive to the correlation detection signal for accumulating a first correlation count indicating a detection of a first received data sequence characteristic of the signaling format, said register means further sequentially accumulating subsequent correlation counts indicating the detection and absence of detection of subsequently received data sequences;

first counting means, for providing a measure of elapsed time by generating a count in response to the timing signals, controller means, coupled to said register means, for detecting when the first detected correlation count accumulated has shifted to the last storage location of said register means, and for generating a display enable signal in response thereto, said controller means further resetting the count of said first counting means in response to the correlation detection signal being generated; and display means, responsive to the display enable signal, for displaying an indication of the accumulated correlation count which corresponds to the number of correlations between the received and stored data sequences within a first time interval, the indication displayed thereafter being periodically updated with subsequently received data sequences characteristic of the signaling format to provide a substantially continuous display of the quality of selective call signal reception.

13. The selective call receiver of claim 12, wherein the transmitted data sequence comprises a synchronization codeword.

14. The selective call receiver of claim 12 wherein said shift register is resettable, and said control means is responsive to the count of said first counting means, for resetting the shift register when the count in said first counting means exceeds a predetermined count corresponding to an elapsed time equal to a first predetermined time interval.

15. The selective call receiver of claim 12, wherein said controller means includes means for effecting the display of the number of detections representing signal quality for subsequent counts detected in the first stage of said shift register, after the first count has shifted into the last stage of said shift register.

16. The selective call receiver of claim 15, wherein said controller means further comprises means for latching the display of the number of detections after the end of said first predetermined time interval, whereby a continuous indication of the quality of reception is displayed from detection to detection.

17. The selective call receiver of claim 16 further comprising second counting means, coupled to said controller means and responsive to the timing signals for providing a count starting when the first count loaded into the first stage of said shift register is shifted to the last stage, said controller means thereafter resetting the count of said second counting means in response to subsequent counts indicating correlation between the received data sequence and the stored data sequence being loaded into the first stage of said shift register, whereby said second counting means is periodically reset when the subsequently received data sequence is detected and shifted into the first stage of said shift register.

18. The selective call receiver of claim 17 wherein the count of said second counter means expires when the count exceeds a predetermined count corresponding to an elapsed time equal to a second predetermined time interval, and said controller means is further responsive to said second counter means being expired for monitoring the last stage of the shift register to detect when the first count has shifted into the last stage.

19. The selective call receiver of claim 18 wherein the second timed interval is substantially greater than said first time interval, and wherein means are provided for displaying an indication of no reception if no synchronization codeword is detected during said second time interval.

* * * * *